United States Patent

[11] 3,615,816

| [72] | Inventors | Theodore E. Majewski;<br>Arthur J. Pastor, both of Midland, Mich. |
|---|---|---|
| [21] | Appl. No. | 788,654 |
| [22] | Filed | Jan. 2, 1969 |
| [45] | Patented | Oct. 26, 1971 |
| [73] | Assignee | The Dow Chemical Company<br>Midland, Mich. |

[54] COMPOSITION AND USE THEREOF FOR REMOVAL OF DEPOSITS FROM A METAL SURFACE
8 Claims, No Drawings

[52] U.S. Cl.................................................. 134/3,
134/35; 134/41, 252/87
[51] Int. Cl..................................................... C23g 1/02
[50] Field of Search............................................ 252/80,
181, 86, 100; 134/3, 22, 35, 41

[56] References Cited
UNITED STATES PATENTS

| 2,837,484 | 6/1958 | Sway et al..................... | 252/100 |
| 3,073,726 | 1/1963 | Frasch.......................... | 134/3 |
| 3,087,841 | 4/1963 | De Long....................... | 252/100 |
| 3,261,710 | 7/1966 | Waldmann..................... | 252/100 |
| 3,379,645 | 4/1968 | Kendall........................ | 252/100 |

Primary Examiner—Leon D. Rosdol
Assistant Examiner—William E. Schulz
Attorneys—Griswold & Burdick and Charles W. Carlin ABSTRACT: Deposits are removed effectively from a metal surface to which they are adhering by contacting such solids with a composition comprising by weight of from about 1 to about 6 percent $CrO_3$, from about 38 to about 60 percent $H_2SO_4$, and balance substantially water, to solubilize the deposits and removing the so used composition containing solubilized deposits.

COMPOSITION AND USE THEREOF FOR REMOVAL OF DEPOSITS FROM A METAL SURFACE

BACKGROUND OF THE INVENTION

The invention relates to the removal of difficulty soluble, more-or-less tenaciously adhering solids, varying in consistency and hardness, comprising incrustations, scale, gummy or greasy accumulations and the like including either or both organic and/or inorganic materials and particularly mixtures thereof from metal surfaces. The surface to which the invention specifically relates is that found on the inside of heat exchangers, steam boilers (including both the coils or tubes and the shell) and most especially the tubes, shells, and transfer lines and vessels through which fluids being treated and temperature-conditioning fluids pass in refinery equipment. Such equipment, because of its intricate design and the nature of the accumulated scale and due to the desire to remove such scale at or near operating temperatures during a minumum of down time and without the need to use techniques requiring abrasive materials or mechanical devices, makes meeting the need for an effective chemical cleaning process for such equipment especially important.

Great difficulties have been encountered in attempting to remove adhering solids commonly associated with refinery equipment because the carbonaceous and hydrocarbonaceous organic materials are often intimately associated with inorganic materials which combination is exceedingly resistant to solubilization by any known composition. Many of the units of such refinery equipment needing cleaning are located at difficulty accessible places and cannot practically be dismantled and cleaned by abrasive or jet means. For example, a usually effective remover of such deposits, viz, a nitrosyl sulfuric acid and sulfuric acid mixture, is not satisfactory because, although it attacks the organic materials, it does not attack the inorganic. Nitric acid compositions are not acceptable because an adequate inhibitor of the corrosivity nitric acid on metals is not know. Hydrochloric acid does not adequately attack the organic materials in the scale. In fact, heretofore, certain cokelike nd polymeric deposits in refineries have resisted effective solublization by any known chemical agent.

SUMARY THE INVENTION

The invention provides a composition which when used in accordance with the method of the invention safely and effectively solubilizes scale of the nature above described at temperatures between about 125° F. and about 300° F. and preferably between about 150° F. and 250° F. Some benefit is obtained within a few minutes by the practice of the invention, but it is recommended that the time for treatment be at least about 0.5hour. It may require as long as 6hours in severe cases.

The invention is (1) a composition comprising by weight between about 1and about 6percent of $CrO_3$, between about 38 and about 60percent of $H_2SO_4$, and enough water to make 100percent and (2) the method of removing adhering deposits from ferrous metal surfaces, (an alloy comprising at least about 50percent iron) particularly from carbon steel surfaces (e.g. AISI 1010or 1020)employing said composition. For practical use, the composition used in the invention seldom contains less than about 3percent $CrO_3$and seldom contains more than about 57percent $H_2SO_4$.All percentage compositions to which reference are made herein are per cent by weight.

$CrO_3$is commonly referred to as chromic trioxide or chromic acid. If preferred it may be found in situ in the aqueous $H_2SO_4$(as by adding dichromate compound which decomposes in $H_2SO_4$yielding $CrO_3$) but no advantage is seen by following such procedure since $CrO_3$is a stable solid powder. It is understood, however, that the invention covers an embodiment wherein the $CrO_3$is formed in situ.

PRACTICE OF THE INVENTION

When less than about 3percent $CrO_3$is employed in the composition, the corrosion rates of the ferrous metal tend to increase undesirably. Therefore the $CrO_3$concentration is unusually at least about 3percent and preferably at least 3.5percent. There is no upper critical limit to the amount of $CrO_3$employed, but as more practical matter re than about 6 percent $CrO_3$cannot be dissolved in solution aqueous solution $H_2SO_4$ of the required concentration.

The concentration the $H_2SO_4$ is preferably above about 40 percent and more commonly above about 47 percent because the danger of corrosion is thereby lessened. On the other hand, the $H_2SO_4$is preferably below about 55 percent because at higher concentrations than that, it is less effective than desired to remove the adhering solids particularly because insufficient $CrO_3$dissolves in appreciably higher $H_2SO_4$ concentrations. Accordingly, between about 47percent and about 55percent $H_2SO_4$is most commonly used. For practical purposes, the concentration of $CrO_3$and of $H_2SO_4$ should be such as to provide enough $CrO_3$to show insufficient corrosion to be objectionable and on the other hand, enough $H_2SO_4$ should be present to remove the deposits. The highest limit of $CrO_3$ is that which dissolves in the selected concentration of $H_2SO_4$ in water. For example, in a 52percent to 53percent $H_2SO_4$ solution, not more than about 5percent $CrO_3$will dissolve at 200° F. If the concentration of $H_2SO_4$ is greater than about 60percent it is not possible to dissolve as much as 3percent $CrO_3$.For practical operation according to the invention the $H_2SO_4$ concentration is high enough to remove the adhering deposits but yet not so high that enough $CrO_3$cannot be dissolved to provide adequate protection to the ferrous metal being treated.

In summation, the following amounts of $CrO_3$ an $H_2SO$in percent by weight and balance water may be employed in the practice of the invention

| | $CrO_3$ | $H_2SO_4$ |
|---|---|---|
| Operable | 1 to 6 | 38 to 60 |
| Preferred | 3 to saturation point of aqueous $H_2SO_4$ | 40 to 57 |
| Most commonly used | 3.5 to 5 | 47 to 55 |

The invention may be practiced by employing any convenient and available mixer to prepare the composition. The components of the composition, within the specified proportions are readily miscible to prepare a stable composition.

To clean a tubing, transfer line, storage tank, heat exchanger shell, or the like, hereinafter referred to usually as a vessel, the composition is preferably heated to at least 150° but preferably not over abut 250° F. and pumped through the vessel having scale on the interior thereof to be removed or, alternatively in the case of a small vessel immersing the vessel in the cleaning composition, so that the cleaning composition is brought into contact with the deposits to be removed and such contact maintained for at least about 0.5hour during which time the deposits are subjected to a soaking process. Some agitation during the soaking period is often helpful but is not necessary. The following examples are illustrative of the practice of the invention.

Six different samples of deposits were obtained from commercial refining units. They consisted of mixtures of organic and inorganic materials.

SERIES ONE

The percent organic material in the six different samples was obtained by ignition loss and were found to be the values shown in table I.

TABLE I

Series One

Ignition Loss of Deposit

| Deposit Number | Organic Content by weight |
|---|---|
| 1 | 28.3% |
| 2 | 44.6% |
| 3 | 41.9% |
| 4 | 36.8% |
| 5 | 19.1% |
| 6 | 45.2% |

SERIES TWO

In each six 250milliliter beakers as placed 1gram each the six different deposits to make a total of 36 tests. To each beaker, containing the one-gram sample of the untreated deposits were added 150milliliters of a solution containing 5percent of $CrO_3$ dissolved in aqueous solutions of $H_2SO_4$ of varying concentrations each of the six solutions (of each the six sets of tests) being increased by 10percent from 10percent in the first test to 60percent in the sixth test. The resulting actual percent by weight of each of $CrO_3$, $H_2SO_4$ and $H_2O$ are also set out in the table II, infra. Each of the 36beakers was then covered with a watch glass, placed in an oil bath at 175° F. and retained therein for 6 hours. At the end that time, the solutions still at 175° F; were filtered on a preweighted coarse 60 -milliliter sintered glass Buchner funnel. The residue was collected on the filter and washed by passing a measured quantity of water therethrough until no color remained. The amount of water required for each sample to attain this end was 200milliliters. The funnel containing the residue was placed in an oven at 200° F., retained therein for 16hours, and thereafter removed therefrom, cooled to room temperature, and weighed. The total weight so obtained was subtracted from the original (funnel plus residue) weight and the resulting difference divided by the original weight, the quotient so calculated was the fraction (which when multiplied by 100percent) gave the percent of deposit which had gone into solution. The results are shown in table II.

SERIES THREE

The procedure of Series Two was repeated except that the temperature of the oil bath into which the beaker containing the samples of deposits and treating solutions were placed and maintained for 6 hours as 200° F. The percents of deposit dissolved in this series are shown in table III.

TABLE II

Series Two—Deposits treated for 6 hours at 175° F. with composition of the invention

| Treating Solution Used | | Percent by Weight of Deposits Dissolved | | | | | |
|---|---|---|---|---|---|---|---|
| 5% by weight $CrO_3$ dissolved in aqueous— | Resulting percent by weight composition | 1 | 2 | 3 | 4 | 5 | 6 |
| 10% $H_2SO_4$ | 9.5% $H_2SO_4$ / 85.7% $H_2O$ / 4.8% $CrO_3$ | 80.1 | 63.5 | 74.0 | 62.6 | 64.6 | 78.5 |
| 20% $H_2SO_4$ | 19.0% $H_2SO_4$ / 76.2% $H_2O$ / 4.8% $CrO_3$ | 84.3 | 74.5 | 82.6 | 67.6 | 79.1 | 84.1 |
| 30% $H_2SO_4$ | 28.6% $H_2SO_4$ / 66.6% $H_2O$ / 4.8% $CrO_3$ | 84.3 | 76.0 | 86.3 | 64.1 | 89.5 | 86.7 |
| 40% $H_2SO_4$ | 38.1% $H_2SO_4$ / 57.1% $H_2O$ / 4.8% $CrO_3$ | 85.5 | ------ | 89.0 | 68.2 | 93.5 | 85.9 |
| 50% $H_2SO_4$ | 47.6% $H_2SO_4$ / 47.6% $H_2O$ / 4.8% $CrO_3$ | 99.8 | 100.0 | 94.7 | 69.4 | 96.9 | 93.1 |
| 60% $H_2SO_4$ | 57.1% $H_2SO_4$ / 38.1% $H_2O$ / 4.8% $CrO_3$[1] | 58.2 | 71.2 | 54.7 | 62.0 | 38.8 | 38.8 |

[1] Due to high concentration of $H_2SO_4$, not all the $CrO_3$ went into solution.

TABLE III

Series Three—Deposits treated for 6 hours at 200° F. with composition of the invention

| Treating Solution Used | | Percent by Weight of Deposits Dissolved | | | | | |
|---|---|---|---|---|---|---|---|
| 5% by weight $CrO_3$ dissolved in aqueous— | Resulting percent by weight composition | 1 | 2 | 3 | 4 | 5 | 6 |
| 10% $H_2SO_4$ | 9.5% $H_2SO_4$ / 85.7% $H_2O$ / 4.8% $CrO_3$ | 81.8 | 74.9 | 81.8 | 74.7 | 77.1 | 82.3 |
| 20% $H_2SO_4$ | 19.0% $H_2SO_4$ / 76.2% $H_2O$ / 4.8% $CrO_3$ | 83.1 | 78.8 | 83.1 | 74.2 | 89.6 | 85.5 |
| 30% $H_2SO_4$ | 28.6% $H_2SO_4$ / 66.6% $H_2O$ / 4.8% $CrO_3$ | 88.6 | 75.2 | 88.6 | 71.4 | 92.1 | 87.5 |
| 40% $H_2SO_4$ | 38.1% $H_2SO_4$ / 57.1% $H_2O$ / 4.8% $CrO_3$ | 95.2 | 100.0 | 97.6 | 68.5 | 96.6 | 89.0 |
| 50% $H_2SO_4$ | 47.6% $H_2SO_4$ / 47.6% $H_2O$ / 4.8% $CrO_3$ | 99.5 | 100.0 | 96.9 | 72.0 | 98.9 | 90.8 |
| 60% $H_2SO_4$ | 57.1% $H_2SO_4$ / 38.1% $H_2O$ / 4.8% $CrO_3$[1] | ------ | ------ | ------ | 72.0 | 72.2 | 56.4 |

[1] Due to the higher concentration of $H_2SO_4$, not all of the $CrO_3$ went into solution.

By reference to tables II and III it can be seen that the most effective concentration of $H_2SO_4$ in water employ, with which 5percent by weight $CrO_3$ has been admixed, is 60 percent and that the least effective concentration of $H_2SO_4$ in water there shown is 60 percent. The tables show that amounts of $H_2SO_4$ down to 10percent are very effective, but, as will be shown subsequently amounts less than about 38percent $H_2SO_4$ are not used because corrosivity then becomes a problem.

SERIES FOUR

Additional 5to 10gram untreated portions of each of the six types deposits identified above by number 1 through 6 were weighed and each slurried several times in 25-ml. portions of carbon tetrachloride to extract any organic components therefrom. The slurries were then filtered, whereby the extracted organic components passed out in the carbon tetrachloride filtrate and the inorganic components remained on the filter.

Repeated attempts were then made, employing known procedures (including the most modern and sophisticated techniques and instrumentation available), to analyze the organic constituents which had been extracted by the $CCl_4$. However they were too complex to permit identification of the components.

The inorganic solids collected on the filters above, identified by numbers 1to 6, were then subjected to X-ray analysis. The results of the various tests of each deposit are set out below in terms of the percentage range obtained for each recovered 1to 6.

X-RAY ANALYSES OF HEAT EXCHANGE DEPOSIT FROM WHICH THE ORGANIC COMPONENTS HAVE BEEN EXTRACTED BY $CCl_4$

TABLE IV.—SERIES FOUR

Deposit No. 1, obtained from shell side of a thermal catalytic cracker

| Compound | Percent by weight |
|---|---|
| $Fe_3(SO_4)_2(OH)_5 \cdot 2H_2O$ | 25-35 |
| $FeSO_4 \cdot 4H_2O$ | 10-20 |
| Magnetite, as $Fe_3O_4$ | 20-30 |
| Hematite, as $Fe_2O_3$ | 5-10 |
| Geothite, as $\alpha$-FeOOH | 10-20 |
| Pyrite, as $FeS_2$ | 5-10 |

Deposit No. 2, obtained from shell side of heat exchanger of a catalytic cracker

| | |
|---|---|
| Goethite as $\alpha$-FeOOH | >30 |
| Pyrrhotite as $Fe_{1-x}S$ | 20-30 |
| Hematite as $Fe_2O_3$ | 10-20 |
| Magnetite as $Fe_3O_4$ | ~5 |

Deposit No. 3, obtained from heat exchanger tube of a catalytic cracker

| | |
|---|---|
| Magnetite as $Fe_3O_4$ | >40 |
| Hematite as $Fe_2O_3$ | 5-10 |
| Pyrrhotite as $Fe_{1-x}S$ | 30-40 |
| Goethite as $\alpha$-FeOOH | 5-10 |

Deposit No. 4, obtained from shell side of heat exchanger from catayltic cracker

| | |
|---|---|
| Pyrrotite as $Fe_{1-x}S$ | >20 |
| Pyrite as $FeS_2$ | 10-20 |
| Quartz as $SiO_2$ | ~5 |

Deposit No. 5, obtained from shell side of a heat exchanger of a catalytic cracker

| | |
|---|---|
| Magnetite as $Fe_3O_4$ | >40 |
| Hematite as $Fe_2O_3$ | 10-20 |
| Pyrrhotite as $Fe_{1-x}S$ | 30-40 |
| Quartz as $SiO_2$ | <5 |
| Iron | <5 |

Deposit No. 6, obtained from shell side of a catalytic cracker

| | |
|---|---|
| Pyrite as $FeS_2$ | 40-50 |
| Pyrrhotite as $Fe_{1-x}S$ | 20-30 |
| Marcasite as $FeS_2$ | 10-20 |
| Ferricferrocyanite as $Fe_4[Fe(CN)_6]_3$ | 10-20 |

Reference to the analyses of the portions of the deposits, not soluble in carbon tetrachloride as set out above show the presence of high proportions of components of very difficulty removable deposits.

SERIES FIVE

The following tests were conducted (not in accordance with the invention) for comparative purposes. They were conducted similarly to the procedures followed above except that only one of the two essential ingredients in the aqueous composition required by the practice the invention was present.

Table V — Continued

Series Five

Effect of Sulfuric Acid or Chromic Acid Alone on Deposits; Deposits Treated for 6 Hours at 200° F. Percentage of Deposit Dissolved in Treating Solution

| Treating Solution | Deposit Numbers | | | | | |
|---|---|---|---|---|---|---|
| | 1 | 2 | 3 | 4 | 5 | 6 |
| 7.5% $CrO_3$ in water | 46.8 | 50.7 | 46.8 | 60.7 | 30.8 | 58.8 |
| Con. $H_2SO_4$ | 68.6 | 66.0 | 67.0 | 44.2 | 23.3 | 34.8 |
| 50% $H_2SO_4$ | 65.8 | 63.5 | 67.1 | 40.8 | 53.1 | 34.9 |
| 80% $H_2SO_4$ | 45.5 | 51.7 | 59.0 | 42.3 | 41.8 | 33.0 |
| 80% $H_2SO_4$ 1.7% $CrO_3$* | 40.1 | 32.3 | 42.6 | 42.4 | 45.8 | 23.9 |

*This was the maximum amount of $CrO_3$ that could be dissolved in 80% aqueous $H_2SO_4$.

Table V shows were where either $CrO_3$ or $H_2SO_4$ alone is dissolved in water and used in attempts to solubilize actual refinery equipment deposits, the results are unsatisfactory Accordingly, both components are essential to attain the objectives of the practice of the invention as shown in tables II and III.

SERIES SIX

The following tests 2343 conducted to show that the composition of the invention can be used to remove scale from steel surfaces without excessive corrosion of metal.

The compositions shown below were prepared. Coupons of AISI carbon steel were polished, weighed and put into the various compositions at 175° F., maintained at that temperature, and the time noted. Periodically thereafter the coupons were removed, washed, dried, reweighed, the rate of corrosion in pounds per square foot per day calculated, and the coupons replaced in the solution. The compositions employed and results obtained are shown in table VI.

TABLE VI

| Concentration of $H_2SO_4$ in water containing 5% by weight $CrO_3$ | Corrosion Rate lb./ft.²/day |
|---|---|
| 10% | 17.1 |
| 20% | 25. |
| 30% | 26.2 |
| 40% | 25.9 |
| 42.14% | 2.9 |
| 42.85% | 2.3 |
| 43.67% | 0.0032 |
| 44.10 | 0.0046 |
| 45.20 | 0.0025 |
| 47.30 | 0.0004 |
| 49.57 | 0.0005 |
| 49.94 | 0.0005 |
| 51.21 | 0.0041 |
| 52.74 | 0.0048 |
| 53.88 | 0.0063 |
| 54.51 | 0.0052 |

Reference to table VI shows that the rate of corrosion drops off precipitously when the percent of $H_2SO_4$ is increased to about 42 percent in the presence of $CrO_3$. when the concentration of $H_2SO_4$ is further increased without dropping the percent of $CrO_3$ appreciably, the rate of corrosion continues to remain very low and well within the acceptable amount for the length of contact which is necessary for removal of scale or other accumulated deposits from a ferrous metal surface in practical operations.

SERIES SEVEN

The following tests were conducted to show the effect of varying the percent of $CrO_3$ in 50 percent aqueous $H_2SO_4$ at 200° F. on dissolving samples of deposit No. 2 (as defined above). The results are shown in table VII

TABLE VII

| % $CrO_3$ by weight | % Deposit No. 2 Dissolved |
|---|---|
| 1.0 | 76.1 |
| 2.0 | 88.8 |
| 3.0 | 95.9 |
| 4.0 | 99.5 |
| 5.0 | 100.0 |
| 6.0 | 99.9 |

Reference to table VII shows that the presence of only one percent $Cr_3$ is adequate but that 5 percent thereof appears optimum in a 50 percent $H_2SO_4$ solution for dissolving refinery-type scale.

SERIES EIGHT

This series of tests was conducted to show the effect of varying times of contact of the descaling solution of the invention with scale which is representative of that which forms on ferrous metal industrial equipment.

1 Gram of No. 2 deposit (as above defined) was placed in 150 ml. of a 47.6 percent $H_2SO_4$ percent, 47.6 percent water, 4.8 percent $CrO_3$ by weight solution at 200° F. and retained at that temperature for 6 hours. At hour intervals the percent scale dissolved was ascertained. The results are shown in table VIII.

TABLE VIII

| Time in Hours | % Scale Deposits Dissolved |
|---|---|
| 1 | 91.6 |
| 2 | 97.0 |
| 3 | 99.5 |
| 4 | 98.3 |
| 5 | 99.8 |
| 6 | 100.0 |

Reference to table VIII shows that excellent results are obtained in 1 hour and complete dissolution the scale occurred in 6 hours. By extrapolation, it is obvious that an appreciable amount of accumulated deposits are dissolved in less than an hour, e.g. in 0.5 hour.

SERIES NINE

The above tests were repeated at 175° F. with comparable results showing but only a slightly slower rate of dissolution.

Having Described out Invention, what we claim and desire to protect by Letters Patent is:

1. A method for removing tenaceously adhering solids composed of organic and inorganic substances from ferrous metal surfaces which involves contacting the solid substances with an aqueous solution consisting essentially of a weight basis from 1 to 6 $CrO_3$ and from about 42 percent to 60 percent $H_2SO_4$ while maintaining the temperature of the composition between about 125° F. and 300° F.

2. The method of claim 1 wherein the $Cro_3$ is present in an ant between about 3.5 and the point of saturation and the $H_2SO_4$ is present in an amount between abut 40 an 57.0 percent.

3. The method of claim 1 herein the $CrO_3$ is present in an aunt at least about 3.5 percent and the $H_2SO_4$ is present in an amount of between about 47 percent and 55 percent.

4. The method according to claim 1 wherein the temperature of both the adhering solids being removed and the composition employed to contact and solubilize the solids is maintained at between about 150° F. and 250° F.

5. The method according to claim 3 wherein the $CrO_3$ is formed in situ in the aqueous $H_2SO_4$ solution by admixing therewith a compound which decomposes therein yielding $CrO_3$ at the conditions of treatment.

6. The method of claim 1 wherein the solid substances are contacted with the composition for at least about 0.5 hour.

7. The method of claim 1 wherein the composition comprises 47 percent to 55 percent $H_2SO_4$ and 3.5 percent to 5 percent $CrO_3$.

8. The method of claim 1 wherein the ferrous metal is carbon steel.

* * * * *

PO-1050
(5/69)

UNITED STATES PATENT OFFICE
CERTIFICATE OF CORRECTION

Patent No. 3,615,816          Dated 26 October 1971

Inventor(s) Theodore E. Majewski and Arthur J. Pastor

It is certified that error appears in the above-identified patent and that said Letters Patent are hereby corrected as shown below:

In column 1, line 5, change "difficulty" to -- difficultly --; in line 32 change "ficulty" to -- ficultly --; in line 38 insert -- of -- between "corrosivity" and "nitric"; in line 41 delete "nd" and insert -- and --; in line 41 insert -- found -- between "deposits" and "in".

In column 2, line 8, delete "re" and insert -- more --; in line 9 delete "solution aqueous solution" and insert -- an aqueous solution of --; in line 11 insert -- of -- between "concentration" and "the"; in line 34 delete "CrO 3" and insert -- $CrO_3$ --.

In column 3, change line 19 from "In each six 250milliliter beakers as placed 1 gram each the" to -- In each of six 250-milliliter beakers was placed 1 gram of each of the --.

In column 4, line 26, insert -- to -- between "water" and "employ,".

In column 5, line 20, change "difficulty" to -- difficultly --; in line 30 insert -- of -- between "practice" and "the"; in line 33 delete "-Continued"; in line 53 (the 6th line under Treating Solution in Table V) delete "80% $H_{SO_4}$" and insert -- 80% $H_2SO_4$ --; in line 66 delete "2343" and insert -- were --

Column 6, line 8 (second number in second column of Table VI), change "25." to -- 25.6 --; in line 51 delete "$Cr_3$" and insert -- $CrO_3$ --.

In column 7, line 2, insert -- of -- between "dissolution" and "the"; in line 10 delete "out" and insert -- Our --; line 16 change "1 to 6" to -- 1 to 6 percent --; in line 19 change "$Cro_3$" to -- $CrO_3$ --; in line 21 delete "ant" and insert -- amount of --.

In column 8, line 1, delete "between abut 40 an" and insert -- of between about 40 and --; in line 3 delete "herein" and insert -- wherein --; in line 4 delete "aunt" and insert -- amount --.

Signed and sealed this 16th day of May 1972.

(SEAL)
Attest:

EDWARD M. FLETCHER, JR.
Attesting Officer

ROBERT GOTTSCHALK
Commissioner of Patents